(12) United States Patent
Guarda et al.

(10) Patent No.: US 11,708,456 B2
(45) Date of Patent: Jul. 25, 2023

(54) (PER)FLUOROPOLYETHER (PFPE) POLYMERS

(71) Applicant: SOLVAY SPECIALTY POLYMERS ITALY S.P.A., Bollate (IT)

(72) Inventors: Pier Antonio Guarda, Arese (IT); Giovanni Simeone, Solaro (IT); Rosaldo Picozzi, Cesate (IT); Marco Galimberti, Bollate (IT)

(73) Assignee: SOLVAY SPECIALTY POLYMERS ITALY S.P.A., Bollate (Milano) (IT)

( * ) Notice: Subject to any disclaimer, the term of this patent is extended or adjusted under 35 U.S.C. 154(b) by 157 days.

(21) Appl. No.: 17/422,474

(22) PCT Filed: Feb. 6, 2020

(86) PCT No.: PCT/EP2020/052979
§ 371 (c)(1),
(2) Date: Jul. 13, 2021

(87) PCT Pub. No.: WO2020/161233
PCT Pub. Date: Aug. 13, 2020

(65) Prior Publication Data
US 2022/0081511 A1    Mar. 17, 2022

(30) Foreign Application Priority Data

Feb. 8, 2019 (EP) .................... 19156266

(51) Int. Cl.
*C08G 65/00* (2006.01)
*C08G 65/331* (2006.01)
*C08G 65/337* (2006.01)

(52) U.S. Cl.
CPC ......... *C08G 65/007* (2013.01); *C08G 65/331* (2013.01); *C08G 65/337* (2013.01)

(58) Field of Classification Search
CPC .................................................. C08G 65/3236
See application file for complete search history.

(56) References Cited

U.S. PATENT DOCUMENTS

| 3,972,856 | A | * | 8/1976 | Mitsch ................ C07D 271/10 528/53 |
| 5,246,588 | A | | 9/1993 | Tonelli et al. |
| 5,262,057 | A | | 11/1993 | Tonelli et al. |
| 5,354,922 | A | * | 10/1994 | Marchionni ....... C08G 18/5015 204/157.92 |
| 7,288,682 | B2 | | 10/2007 | Tchistiakov et al. |

FOREIGN PATENT DOCUMENTS

| EP | 822216 A2 | 2/1998 |
| WO | 2008122639 A1 | 10/2008 |
| WO | 2013060658 A1 | 5/2013 |
| WO | 2016083279 A1 | 6/2016 |
| WO | 2016083280 A1 | 6/2016 |
| WO | WO-2018108866 A1 * | 6/2018 ........... C08G 65/007 |

OTHER PUBLICATIONS

Russo A. and Tonelli C., "Unexpected effect of alkoxides on the reactivity of sodium borohydrid in the reduction of perfluoropolyether carboxylic esters", Journal of Fluorine Chemistry, 2004, vol. 125, p. 181-188.

* cited by examiner

*Primary Examiner* — Christopher M Rodd
(74) *Attorney, Agent, or Firm* — Osha Bergman Watanabe & Burton LLP

(57) ABSTRACT

The present invention relates to novel (per)fluoropolyether polymers characterized by high molecular weight and high functionality, to a process for their manufacture and to their use as intermediate compounds in the preparation of further polymers.

17 Claims, No Drawings

(PER)FLUOROPOLYETHER (PFPE) POLYMERS

CROSS-REFERENCE TO RELATED APPLICATIONS

This application is a U.S. national stage entry under 35 U.S.C. § 371 of International Application No. PCT/EP2020/052979 filed Feb. 6, 2020, which claims priority to European patent application No. 19156266.9 filed on Feb. 8, 2019. The entire contents of these applications are explicitly incorporated herein by this reference.

TECHNICAL FIELD

The present invention relates to novel (per)fluoropolyether (PFPE) polymers characterized by high molecular weight and high functionality, to a process for their manufacture and to their use as intermediate compounds in the preparation of further polymers.

BACKGROUND ART

Bifunctional (per)fluoropolyethers polymers (PFPEs) are known in the art for a number of applications, for example as lubricants, surfactants, coating agents or as macro-monomers in polycondensation reactions. In all such applications it is desirable to use bifunctional PFPEs having a bifunctional content as high as possible. For example, in polycondensation reactions, the use of PFPEs with a very high bifunctional content is necessary in order to avoid stochastic interruption of the polymer chain, which is observed when relevant amounts of monofunctional PFPEs are present.

However, bifunctional PFPEs are typically available in admixture with the monofunctional and neutral (or non-functional) PFPEs, due to the fact that the synthetic methods currently available for their manufacture do not allow to obtain pure the bifunctional polymers. Therefore, subsequent purification is required in order to separate the bifunctional PFPEs from the monofunctional and neutral PFPEs, or to enrich the content of the bifunctional PFPEs. For this purpose, purification processes have been developed and disclosed in the art, which processes typically comprise the use of a solid adsorbent stationary phase and an eluent (reference is made for example to U.S. Pat. Nos. 5,246,588 and 7,288,682 in the name of Solvay Solexis S.p.A; U.S. Pat. No. 5,262,057 and EP 0822216 in the name of Ausimont S.p.A.).

More recently, a process for increasing the content of bifunctional PFPE polymers in a mixture of neutral, mono- and bifunctional PFPE polymers has been disclosed in WO 2013/060658 (in the name of Solvay Specialty Polymers Italy S.p.A.), which process comprises the use of an adsorbent stationary phase and a supercritical fluid as a mobile phase.

Further to the above, another problem in the synthesis of PFPE polymers lies in the difficulty of obtaining PFPE polymers having high molecular weight. Indeed, the currently available methods of synthesis allow obtaining PFPEs having a number average molecular weight (Mn) usually ranging from 400 to 5,000.

On this regard, U.S. Pat. No. 5,354,922 (in the name of Ausimont S.p.A.) discloses that it is possible to obtain peroxy perfluoropolyoxyalkylenes having a viscosity at 20° C. ranging from 300,000 to 8,000,000 cSt, which provide through chemical reduction, neutral perfluoropolyoxyalkylene polymers endowed with a functionality higher than 1.9 and at the same time with a high molecular weight. More in particular, the perfluoropolyoxyalkylene obtained by chemical reduction are said to have a number average molecular weight ranging from 400 to 20,000 and a functionality respectively ranging from 1.99 to 1.88. However, on the one hand, peroxy perfluoropolyoxyalkylenes having a viscosity at 20° C. of 100,000 cSt or higher are very difficult to handle on industrial scale. For viscosity higher than 100,000 cSt at 20° C., the use of a solvent is mandatory, which requires modification in the industrial plant and then a subsequent step for disposing the solvent. On the other hand, this patent exemplified the synthesis of functional perfluoropolyoxyalkylene polymers having a number average molecular weight of 3,200 as maximum.

Also, WO 2008/122639 (in the name of Solvay Solexis S.p.A.) discloses a process for preparing functional perfluoropolyether polymers. Said polymers are said to have a number average molecular weight between 200 and 8,000. However, in the examples only perfluoropolyether polymers having number average molecular weight of 1,080 and 1,270 are prepared.

The above documents actually demonstrate that when high functionality is desired, the final perfluoropolyether polymers are characterized by low number average molecular weight.

PFPEs with (Mn) ranging from 3,500-5,000 are usually isolated from mixtures comprising PFPEs with lower molecular weights. This problem and the isolation of monofunctional PFPEs with high molecular weight was disclosed, for example, in WO 2016/083280 (in the name of Solvay Specialty Polymers Italy S.p.A.).

WO 2016/083279 (in the name of Solvay Specialty Polymers Italy S.p.A.) discloses in Example 4 the synthesis of a polymer obtained by reacting a Fomblin® Z DOL PFPE with Fomblin® Z DOL PFPE comprising nonaflate end groups, such that after thin-layer distillation a polymer having a partially fluorinated backbone comprising three perfluoropolyether segments linked together by hydrogenated chains of formula —$CH_2OCH_2$— and having an average number molecular weight of 8100 g/mol. The functionality of this polymer is not indicated.

SUMMARY OF INVENTION

The Applicant now faced the problem of providing (per)fluoropolyether polymers characterized by both high number average molecular weight (i.e. a number average molecular weight of from about 7,000 and up to 30,000) and high functionality (i.e., of at least 1.80).

While PFPE polymers having a number average molecular weight of up to 10,000 have been disclosed in the art, the Applicant is well aware that when PFPE polymers are prepared by the photooxidation of tetrafluoroethylene, it is necessary to find a balance between the desired molecular weight and the desired functionality. Indeed, in order to obtain a mixture of PFPE polymers characterized by high functionality (such as for example at least 1.80), the number average molecular weight of the final PFPE polymers will be not above 1,500. On the other hand, if a higher number average molecular weight is desired, a starting material having a smaller amount of peroxidic oxygen (PO) should be used, thus negatively affecting the final functionality value. To date, the Applicant is not aware of any photooxidative process applied on industrial scale that allow obtaining a difunctional PFPE polymer having a number average molecular weight of 7,000 or higher.

Also, the Applicant faced the problem of providing (per)fluoropolyether polymers characterized by both high number average molecular weight and high functionality, without the step of purifying a mixture comprising neutral, mono- and bi-functional PFPE polymers. Indeed, as the number average molecular weight of the PFPE polymers increases, the difficulty of finding separation techniques that on industrial scale can efficiently separate neutral, mono and bifunctional polymers also increases.

In addition, the Applicant faced the problem of providing (per)fluoropolyether polymers characterized by both high number average molecular weight and high functionality, whose backbone still comprises units of formula —($CF_2O$)—. Indeed, the C1-recurring units provide to the final PFPE polymers peculiar low temperature properties compared to PFPE polymers whose backbone comprises only recurring units of formula —($CF_2CF_2CF_2O$)— or —[$CF(CF_3)CF_2O$]—.

Surprisingly, the Applicant found that a perfluoropolyether polymer characterized by a number average molecular weight (Mn) of at least 7,000 Dalton (as measured by $^{19}$F-NMR) and functionality (F) of at least 1.80 can be prepared via a convenient process, which can be easily implemented on an industrial scale and does not require separate purification steps.

Thus, in a first aspect, the present invention relates to a process [process (P)] for the manufacture of polymer (PFPE$_{EST}$) as defined below, said process comprising the following steps:
(I) reacting at least one perfluoropolyether diol [polymer (PFPE)] having a functionality of at least 1.90 with at least one perfluoro-bis-vinylether [compound (F)] to provide at least one partially fluorinated polyether polymer [polymer (HFPE)] comprising a partially fluorinated polyether backbone having two chain ends [chains (E$_{HFPE}$)] bonded to opposite sides of said backbone, at least one of said chains (E$_{HFPE}$) comprising one —OH group and the other chain (E$_{HFPE}$) comprising a group selected from —OH, —F, —CF$_3$ or —COOH,
wherein the equivalent ratio between said polymer (PFPE) and said compound (F) is higher than 1;
(II) contacting said at least one polymer (HFPE) obtained in step (I) with at least one compound selected from perfluorinated anhydride, perfluorinated carboxylic acid, carbonyl difluoride, perfluoro acyl fluoride or perfluoro acyl chloride, to provide at least one partially fluorinated polyether polymer [polymer (HFPE$_P$)] comprising a partially fluorinated polyether backbone having two chain ends [chains (E$_{HFPE-P}$)] bonded to opposite sides of said backbone, at least one of said chains (E$_{HFPE-P}$) comprising an ester group or a fluoroformate, and the other chain (E$_{HFPE-P}$) comprising an ester group, a fluoroformate or a group of formula —F, —CF$_3$ or —COOH;
(III) contacting said at least one polymer (HFPE$_P$) obtained in step (II) with at least one source of fluorine, to provide at least one fully fluorinated polyether polymer [polymer (PFPE$_P$)] comprising a fully fluorinated polyether backbone having two chain ends [chains (E$_{PFPE-P}$)] bonded to opposite sides of said backbone, at least one of said chains (E$_{PFPE-P}$) comprising a group —OC(=O)R$^3$ with R$^3$ being —F, —CF$_3$ or a linear or branched perfluorinated alkyl chain comprising from 2 to 6 carbon atoms, optionally interrupted by oxygen atoms, and the other chain (E$_{PFPE-P}$) comprising a group of formula —F, —CF$_3$ or a group —OC(=O)R$^3$ with R$^3$ being as defined above;
(IV) contacting said at least one polymer (PFPE$_P$) with a compound comprising at least one group able of providing a nucleophilic substitution, to provide a perfluoropolyether polymer [polymer (PFPE$_{EST}$)] comprising a fully fluorinated backbone having two chain ends [chains (E$_{PFPE-EST}$)] bonded to opposite sides of said backbone, at least one of said chain (E$_{PFPE-EST}$) comprising one group of formula —C(=O)X$^1$ with X$^1$ being —OH or an alkoxy chain comprising from 1 to 6 carbon atoms, and the other chain (E$_{PFPE-EST}$) comprising a group of formula —F, —CF$_3$ or —C(=O)X$^1$ with X$^1$ being as defined above,
and wherein said backbone complies with the following formula:

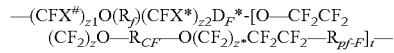

wherein:
t is in integer from 1 to 30, preferably from 1 to 25, more preferably from 1 to 20, each of z and z* is independently 0 or 1;
z1 is an integer equal to or higher than 1;
z2 is 0 or an integer equal to or higher than 1;
X$^\#$ and X*, equal or different from each other, are —F or —CF$_3$, provided that when z1 and/or z2 are higher than 1, X$^\#$ and X* are —F;
D$_F$* is a perfluorinated alkylene chain comprising from 1 to 6, more preferably from 1 to 3 carbon atoms, said alkyl chain being optionally substituted with at least one perfluoroalkyl group comprising from 1 to 3 carbon atom;
R$_{CF}$ is a perfluoro alkyl chain comprising from 2 to 12, preferably from 2 to 6, carbon atoms, optionally interrupted by one or more oxygen atoms;
(R$_f$) comprises, preferably consists of, repeating units R°, said repeating units being independently selected from the group consisting of:
(i) —CFXO—, wherein X is F or CF$_3$;
(ii) —CFXCFXO—, wherein X, equal or different at each occurrence, is F or CF$_3$, with the proviso that at least one of X is —F;
(iii) —CF$_2$CF$_2$CF$_2$O—;
(iv) —CF$_2$CF$_2$CF$_2$CF$_2$O—;
(v) —(CF$_2$)$_j$—CFZ—O— wherein j is an integer from 0 to 3 and Z is a group of general formula —O—R$_{(f-a)}$-T, wherein R$_{(f-a)}$ is a fluoropolyoxyalkene chain comprising a number of repeating units from 0 to 10, said recurring units being chosen among the following: —CFXO—, —CF$_2$CFXO—, —CF$_2$CF$_2$CF$_2$O—, —CF$_2$CF$_2$CF$_2$CF$_2$O—, with each of each of X being independently F or CF$_3$ and T being a C$_1$-C$_3$ perfluoroalkyl group;
R$_{pf-F}$ is a chain of formula:

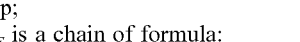

wherein
z1, z2, X$^\#$, X* and (R$_f$) are as defined above;
D$_F$ is a perfluorinated alkylene chain comprising from 1 to 6, more preferably from 1 to 3 carbon atoms, said alkyl chain being optionally substituted with at least one perfluoroalkyl group comprising from 1 to 3 carbon atoms.

The Applicant surprisingly found that the abovementioned process (P) allows to obtain partially and fully fluorinated polyether polymers characterized by a novel chemical structure.

Thus, in a second aspect, the present invention relates to a polymer (HFPE) comprising a partially fluorinated polyether backbone having two chain ends [chains (E$_{HFPE}$)] as defined above, wherein said backbone complies with the following formula:

wherein
t is an integer from 1 to 30;
each of z and z* is independently 0 or 1;
$R_{CF}$ is a perfluoro alkyl chain comprising from 1 to 12, preferably from 2 to 6 carbon atoms, optionally interrupted by one or more oxygen atoms;
z1 and z2, equal or different from each other, are integers, equal to or higher than 1;
$X^\#$ and $X^*$, equal or different from each other, are —F or —$CF_3$, provided that when z1 and/or z2 are higher than 1, $X^\#$ and $X^*$ are —F;
D and D*, equal or different from each other, are a sigma bond, or an alkylene chain comprising from 1 to 6, more preferably from 1 to 3 carbon atoms, said alkyl chain being optionally substituted with at least one perfluoroalkyl group comprising from 1 to 3 carbon atoms;
$R_{pf}$ is a chain of formula:

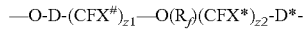

wherein z1, z2, $X^\#$, $X^*$, D and D* are as defined above, and $(R_f)$ comprises, preferably consists of, repeating units R°, selected from the group consisting of formulae (i) to (v) as defined above.

Advantageously, in said polymer (HFPE), at least 90% of said chain ends comprises one group of formula —OH. The functionality ($F_{HFPE-OH}$) for polymer (HFPE) is calculated according to the equation reported above:

$$F_{HFPE-OH} = 2*E_f/(E_f+E_n)$$

wherein
$E_f$ is the number of —OH end groups and
$E_n$ is the number of —F, —$CF_3$ and —COOH end groups.

Advantageously, said polymer (HFPE) is characterized by a number average molecular weight (Mn) of at least 7,000 Dalton (as measured by $^{19}$F-NMR), preferably of at least 9,000 Dalton, more preferably of at least 9,500 Dalton. Preferably, said polymer (HFPE) is characterized by a number average molecular weight (Mn) of 30,000 Dalton or lower, more preferably up to 25,000 Dalton, even more preferably up to 20,000 Dalton.

Advantageously, said polymer (HFPE) is characterized by a functionality (F) of at least 1.80, more preferably of at least 1.85, even more preferably of at least 1.89 and still more preferably of at least 1.92. Preferred embodiment has a functionality of at least 1.95.

In a third aspect, the present invention relates to a polymer (HFPE$_P$) comprising a partially fluorinated backbone as defined above for polymer (HFPE), said backbone having two chain ends [chains ($E_{HFPE-P}$)] bonded to opposite sides of said backbone, at least one of said chains ($E_{HFPE-P}$) comprising a group —OC(=O)$R^3$ with $R^3$ with $R^3$ being —F, —$CF_3$ or a linear or branched perfluorinated alkyl chain comprising from 2 to 6 carbon atoms, optionally interrupted by oxygen atoms and the other chain end comprising a group —OC(=O)$R_3$ with $R_3$ being as defined above or a group of formula —F, —$CF_3$ or —COOH.

The functionality ($F_{HFPE-P}$) for polymer (HFPE$_P$) is calculated according to the equation reported below:

$$F_{HFPE-P} = 2*E_f/(E_f+E_n)$$

wherein
$E_f$ is the number groups —OC(=O)$R^3$ with $R^3$ being —F or —$CF_3$ and
$E_n$ is the number of —F, —$CF_3$ and —COOH end groups.

Advantageously, said polymer (HFPE$_P$) is characterized by a number average molecular weight (Mn) of at least 7,000 Dalton (as measured by $^{19}$F-NMR), preferably of at least 9,000 Dalton, more preferably of at least 9,500 Dalton. Preferably, said polymer (HFPE$_P$) is characterized by a number average molecular weight (Mn) of 30,000 Dalton or lower, more preferably up to 25,000 Dalton, even more preferably up to 20,000 Dalton.

Advantageously, said polymer (HFPE$_P$) is characterized by a functionality (F) of at least 1.80, more preferably of at least 1.85, even more preferably of at least 1.89 and still more preferably of at least 1.92. Preferred embodiment has a functionality of at least 1.95.

In a fourth aspect, the present invention relates to a polymer (PFPE$_P$) comprising a fully fluorinated polyether backbone having two chain ends [chains ($E_{PFPE-P}$)] as defined above, and
said backbone complying with the following formula:

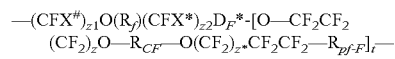

wherein
t is in integer from 1 to 30,
each of z and z* is independently 0 or 1;
z1 is an integer equal to or higher than 1;
z2 is 0 or an integer, equal to or higher than 1;
$X^\#$ and $X^*$, equal or different from each other, are —F or —$CF_3$, provided that when z1 and/or z2 are higher than 1, $X^\#$ and $X^*$ are —F;
$D_F*$ is a perfluorinated alkylene chain comprising from 1 to 6, more preferably from 1 to 3 carbon atoms, said alkyl chain being optionally substituted with at least one perfluoroalkyl group comprising from 1 to 3 carbon atom;
$R_{CF}$ is a perfluoro alkyl chain comprising from 2 to 12, preferably from 2 to 6, carbon atoms, optionally interrupted by one or more oxygen atoms;
$(R_f)$ comprises, preferably consists of, repeating units R°, said repeating units being independently selected from the group consisting of:
(i) —CFXO—, wherein X is F or $CF_3$;
(ii) —CFXCFXO—, wherein X, equal or different at each occurrence, is F or $CF_3$, with the proviso that at least one of X is —F;
(iii) —$CF_2CF_2CF_2O$—;
(iv) —$CF_2CF_2CF_2CF_2O$—;
(v) —$(CF_2)_j$—CFZ—O— wherein j is an integer from 0 to 3 and Z is a group of general formula —O—$R_{(f-a)}$-T, wherein $R_{(f-a)}$ is a fluoropolyoxyalkene chain comprising a number of repeating units from 0 to 10, said recurring units being chosen among the following: —CFXO—, —$CF_2CFXO$—, —$CF_2CF_2CF_2O$—, —$CF_2CF_2CF_2CF_2O$—, with each of each of X being independently F or $CF_3$ and T being a $C_1$-$C_3$ perfluoroalkyl group;
$R_{pf-F}$ is a chain of formula:

wherein
z1, z2, $X^\#$, $X^*$ and $(R_f)$ are as defined above;
$D_F$ and $D_F*$, equal or different from each other, are a perfluorinated alkylene chain comprising from 1 to 6, more preferably from 1 to 3 carbon atoms, said alkyl chain being optionally substituted with at least one perfluoroalkyl group comprising from 1 to 3 carbon atoms.

The functionality ($F_{PFPE-P}$) for polymer (PFPE$_P$) is calculated according to the equation reported below:

$$F_{PFPE-P} = 2*E_f/(E_f+E_n)$$

wherein $E_f$ is the number of groups —OC(=O)R$^3$ with R$^3$ being —F, —CF$_3$ or a linear or branched perfluorinated alkyl chain comprising from 2 to 6 carbon atoms, optionally interrupted by oxygen atoms, and $E_n$ is the number of groups —F, —CF$_3$.

Advantageously, said polymer (PFPE$_P$) is characterized by a number average molecular weight (Mn) of at least 7,000 Dalton (as measured by $^{19}$F-NMR), preferably of at least 9,000 Dalton, more preferably of at least 9,500 Dalton. Preferably, said polymer (PFPE$_P$) is characterized by a number average molecular weight (Mn) of 30,000 Dalton or lower, more preferably up to 25,000 Dalton, even more preferably up to 20,000 Dalton.

Advantageously, said polymer (PFPE$_P$) is characterized by a functionality ($F_{PFPE-P}$) of at least 1.80, more preferably of at least 1.85, even more preferably of at least 1.89 and still more preferably of at least 1.92. Preferred embodiment has a functionality of at least 1.95.

In a fifth aspect, the present invention related to a perfluoropolyether polymer [polymer (PFPE$_{EST}$)] as defined above.

Advantageously, said polymer (PFPE$_{EST}$) is characterized by a number average molecular weight (Mn) of at least 7,000 Dalton (as measured by $^{19}$F-NMR), preferably of at least 9,000 Dalton, more preferably of at least 9,500 Dalton. Preferably, said polymer (PFPE$_{EST}$) is characterized by a number average molecular weight (Mn) of 30,000 Dalton or lower, more preferably up to 25,000 Dalton, even more preferably up to 20,000 Dalton.

The functionality ($F_{EST}$) for polymer (PFPE$_{EST}$) is calculated according to the equation reported below:

$$F_{EST}=2E_f/(E_f+E_n)$$

wherein $E_f$ is the number of groups —C(=O)X$^1$ with X$^1$ being —OH or an alkoxy chain comprising from 1 to 6 carbon atoms and $E_n$ is the number of groups —F and —CF$_3$.

Advantageously, said polymer (PFPE$_{EST}$) is characterized by a functionality ($F_{EST}$) of at least 1.80, more preferably 1.85, even more preferably of at least 1.89 and still more preferably of at least 1.92. Preferred embodiment has a functionality of at least 1.95.

Advantageously, said polymer (PFPE$_{EST}$) can be further reacted to provide useful PFPE derivatives, such as PFPE comprising at their chain ends (poly)amido group(s) and hydroxy group(s).

PFPE comprising hydroxy groups are of particular interest within the present invention.

In a further aspect, the present invention relates to a perfluoropolyether polymer [polymer (PFPE$_{OHOH}$)] comprising a fully fluorinated polyether backbone complying with the formula provided above for polymer (PFPE$_P$) and having two chain ends [chains (E$_{PFPE-OHOH}$)] bonded to opposite sides of said backbone, at least one of said chains (E$_{PFPE-OHOH}$) comprising one group of formula —CH$_2$OH, and the other chain end comprising a group of formula —CH$_2$OH, —F, —CF$_3$.

Advantageously, in said polymer (PFPE$_{OHOH}$), at least 90% of said chains (E$_{HWHF}$) comprises one group of formula —OH, or in other words said polymer (PFPE$_{OHOH}$) has a functionality ($F_{OHOH}$) of at least 1.80.

The functionality ($F_{OHOH}$) for polymer (PFPE$_{OHOH}$) is calculated according to the equation reported below:

$$F_{OHOH}=2E_f/(E_f+E_n)$$

wherein $E_f$ is the number of —OH end groups and $E_n$ is the number of —F, —CF$_3$ end groups.

Advantageously, said polymer (PFPE$_{OHOH}$) is characterized by a number average molecular weight (Mn) of at least 7,000 Dalton (as measured by $^{19}$F-NMR), preferably of at least 9,000 Dalton, more preferably of at least 9,500 Dalton. Preferably, said polymer (PFPE$_{OHOH}$) is characterized by a number average molecular weight (Mn) of 30,000 Dalton or lower, more preferably up to 25,000 Dalton, even more preferably up to 20,000 Dalton.

Advantageously, said polymer (PFPE$_{OHOH}$) is characterized by a functionality (F) of at least 1.80, more preferably of at least 1.85, even more preferably of at least 1.89 and still more preferably of at least 1.92. Preferred embodiment has a functionality of at least 1.95.

DESCRIPTION OF EMBODIMENTS

For the purpose of the present description and of the following claims:

the use of parentheses around symbols or numbers identifying the formulae, for example in expressions like "polymer (P)", etc., has the mere purpose of better distinguishing the symbol or number from the rest of the text and, hence, said parenthesis can also be omitted;

the acronym "PFPE" stands for "(per)fluoropolyether" and, when used as substantive, is intended to mean either the singular or the plural from, depending on the context;

the term "(per)fluoropolyether" is intended to indicate fully or partially fluorinated polymer;

the expression "functionality of the (per)fluoropolyether polymer" of the invention is defined as the number of functional groups of interest per polymer molecule, according to the following equation:

$$F=2*E_f/(E_f+E_n)$$

wherein $E_f$ is the number of functional end groups of interest and $E_n$ is the number of perfluorinated end groups (notably comprising —F and —CF$_3$ groups) plus the number of functional ends groups different from those measured as $E_f$. Functionality (F) can be determined, for instance, by $^{19}$F-NMR, as disclosed in the experimental section.

Advantageously, polymer (PFPE) used as starting material in the process (P) of the present invention comprises a perfluoropolyether backbone having two chain ends bonded to opposite sides of said backbone, wherein said backbone complies with the following formula:

$$-D-(CFX^\#)_{z1}-O(R_f)(CFX^*)_{z2}-D^*-$$

wherein D, D*, X$^\#$, X*, $z_1$, $z_2$ and R$_f$ are as defined above and wherein said chain ends comprises at least one hydroxy group or a group of formula —F and —CF$_3$, said polymer (PFPE) being characterized by a functionality (F) of at least 1.90.

Advantageously, the functionality (F) of said polymer (PFPE) is of at least 1.95 and even more preferably of 1.99. The functionality (F) of polymer (PFPE) is calculated according to the following equation:

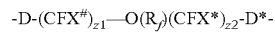

$$F_{OH}=2*E_f/(E_f+E_n)$$

wherein

Ef is the number of —OH end groups

En is the number of —F and —CF$_3$ end groups.

Preferably, said chain ($R_f$) complies with the following formula:

$$-[(CFX^1O)_{g1}(CFX^2CFX^3O)_{g2}(CF_2CF_2CF_2O)_{g3}(CF_2CF_2CF_2CF_2O)_{g4}]- \quad (R_f\text{-I})$$

wherein
$X^1$ is independently selected from —F and —$CF_3$,
$X^2$, $X^3$, equal or different from each other and at each occurrence, are independently —F, —$CF_3$, with the proviso that at least one of X is —F;
g1, g2, g3, and g4, equal or different from each other, are independently integers ≥0, such that g1+g2+g3+g4 is in the range from 2 to 70, preferably from 2 to 60; should at least two of g1, g2, g3 and g4 be different from zero, the different recurring units are generally statistically distributed along the chain.

More preferably, chain ($R_f$) is selected from chains of formula:

$$-[(CF_2CF_2O)_{a1}(CF_2O)_{a2}]- \quad (R_f\text{-IIA})$$

wherein:
a1 and a2 are independently integers ≥0 such that the number average molecular weight is between 400 and 5,000, preferably between 500 and 3,000; both a1 and a2 are preferably different from zero, with the ratio a1/a2 being preferably comprised between 0.1 and 10;

$$-[(CF_2CF_2O)_{b1}(CF_2O)_{b2}(CF(CF_3)O)_{b3}(CF_2CF(CF_3)O)_{b4}]- \quad (R_f\text{-IIB})$$

wherein:
b1, b2, b3, b4, are independently integers ≥0 such that the number average molecular weight is between 400 and 5,000, preferably between 400 and 3,000; preferably b1 is 0, b2, b3, b4 are >0, with the ratio b4/(b2+b3) being ≥1;

$$-[(CF_2CF_2O)_{c1}(CF_2O)_{c2}(CF_2(CF_2)_{cw}CF_2O)_{c3}]- \quad (R_f\text{-IIC})$$

wherein:
cw=1 or 2;
c1, c2, and c3 are independently integers ≥0 chosen so that the number average molecular weight is between 400 and 5,000, preferably between 400 and 3,000; preferably c1, c2 and c3 are all >0, with the ratio c3/(c1+c2) being generally lower than 0.2;

$$-[(CF_2CF(CF_3)O)_d]- \quad (R_f\text{-IID})$$

wherein:
d is an integer >0 such that the number average molecular weight is between 400 and 5,000, preferably between 400 and 3,000;

$$-[(CF_2CF_2C(Hal^*)_2O)_{e1}-(CF_2CF_2CH_2O)_{e2}-(CF_2CF_2CH(Hal^*)O)_{e3}]- \quad (R_f\text{-IIE})$$

wherein:
Hal*, equal or different at each occurrence, is a halogen selected from fluorine and chlorine atoms, preferably a fluorine atom;
e1, e2, and e3, equal to or different from each other, are independently integers ≥0 such that the (e1+e2+e3) sum is comprised between 2 and 50.

Still more preferably, chain ($R_f$) complies with formula ($R_f$-III) here below:

$$-[(CF_2CF_2O)_{a1}(CF_2O)_{a2}]- \quad (R_f\text{-III})$$

wherein:
a1, and a2 are integers >0 such that the number average molecular weight is between 400 and 5,000, preferably between 400 and 3,000, with the ratio a1/a2 being generally comprised between 0.1 and 10, more preferably between 0.2 and 5.

Preferably, said compound (F) complies with the following formula:

$$CF_2=CF(CF_2)_zOR_{CF}O(CF_2)_{z*}CF=CF_2$$

wherein
each of z and z* is independently 0 or 1; and
$R_{CF}$ has the same meanings defined above for polymer PFPE.

Preferred compounds (F) are those complying with the following formulae (F-I) to (F-VIII):

$$CF_2=CFO(CF_2)_2OCF=CF_2 \quad (F\text{-I})$$

$$CF_2=CFO(CF_2)_3OCF=CF_2 \quad (F\text{-II})$$

$$CF_2=CFO(CF_2)_{40}CF=CF_2 \quad (F\text{-III})$$

$$CF_2=CFCF_2O(CF_2)_{40}CF_2CF=CF_2 \quad (F\text{-IV})$$

$$CF_2=CFO-CF_2O-(CF_2)_2O(CF_2)_{20}-CF_2O-CF=CF_2 \quad (F\text{-V})$$

$$CF_2=CFO-CF_2O-(CF_2)_2O-CF_2O-CF=CF_2 \quad (F\text{-VI})$$

$$CF_2=CFO-CF_2O-(CF_2)_3O-CF_2O-CF=CF_2 \quad (F\text{-VII})$$

$$CF_2=CFO-CF_2O-(CF_2)_4O-CF_2O-CF=CF_2 \quad (F\text{-VIII})$$

$$CF_2=CFO-CF_2CF_2O-CF_2CF_2O-CF=CF_2 \quad (F\text{-IX})$$

The equivalent ratio between said polymer (PFPE) and said compound (F) can be properly selected depending on the desired number average molecular weight of polymer (HFPE) and most importantly of the final polymer ($PFPE_{OHOH}$).

Advantageously, the equivalent ratio between said polymer (PFPE) and said compound (F) is from 1.01 to 1.50, more preferably from 1.05 to 1.25.

Advantageously, said step (1) is performed such that the functionality of polymer (HFPE) is not less than 90% of the functionality of the starting polymer (PFPE), preferably not less than 92%, even more preferably not less than 95%.

Preferably, said step (1) is performed in the presence of a base, even more preferably in the presence of potassium carbonate.

Preferably, said step (1) is performed in the presence of a polar aprotic solvent, which is more preferably selected from the group comprising, preferably consisting of, acetonitrile, tetrahydrofuran, dioxane, dimethoxyethane (glyme), bis(2-methoxyethyl) ether (di-glyme), triethylene glycol dimethyl ether (tri-glyme), tetraethylene glycol dimethyl ether (tetra glyme), dimethyl sulfoxide, dimethylformamide, ethylene polyoxides dimethyl ethers. Acetonitrile, tetrahydrofuran and dioxane are particularly preferred.

Step (1) can be performed by adding said polymer (PFPE) to said compound (F), or vice versa by adding said compound (F) to said polymer (PFPE).

Preferably, said step (1) is performed at a temperature in the range from room temperature (i.e., about 25° C.) to 90° C.

Preferably, said step (1) is performed in the presence of a phase transfer catalyst, advantageously selected from tetra-alkyl-ammonium.

Advantageously, said step (1) is performed working in an anhydrous reaction environment.

Preferably, after step (1), polymer (HFPE) is provided essentially comprising at its chain ends the following groups: —OH, —F, —$CF_3$ and —COOH.

The expression "essentially comprising" is intended to indicate that the chain ends of said polymer (HFPE) may comprise, in addition to the above detailed groups, a minor amount of end groups deriving by side reactions or impurities in the starting materials, being understood that the amount thereof will be such not to substantially modify the properties of the polymer (HFPE). For example, end groups different from —OH, —F, —CF$_3$ and —COOH (such as of formula —CH$_2$Cl) might be present in an amount of less than 1% moles, more preferably of less than 0.5% moles and even more preferably of less than 0.1% moles based on the overall amount of end groups in polymer (HFPE).

It will be apparent to those skilled in the art that while the reaction conditions of the step of process (P) of the present invention are controlled, at the end of step (1), a mixture of polymer (HFPE) characterized by different groups at its chain ends is obtained. Nevertheless, the fact remains that the conditions of step (1) of process (P) of the present invention are tuned so as to provide polymer (HFPE) characterized by a functionality as defined above.

The same principle applies and is true for each and every step (II) to (IV) of present process (P).

As will be apparent to those skilled in the art, step (II) of process (P) of the invention is aimed at providing polymer (HFPE$_P$) having protected chain ends.

Preferably, said step (II), is performed in the presence of trifluoracetic anhydride or carbonyl fluoride.

Preferably, the source of fluorine in step (III) is a gas containing fluorine atoms. More preferably, said source of fluorine is fluorine gas (F$_2$).

Advantageously, the source of fluorine in step (Ill) is used in admixture with a diluting gas, preferably selected from inert gas, such as helium and nitrogen.

Advantageously, said step (Ill) is performed in the presence of a compound capable of generating fluorine radicals to help the fluorination step.

Suitable compounds are selected from carbon monoxide and halogenated olefin.

Said halogenated olefin can be selected for example from tetrafluoroethylene (TFE), hexafluoro-propylene (HFP), octafluorobutene, perfluoropentene, perfluorohexene, perfluoroheptene, perfluorooctene, perfluorocyclobutene, perfluorocyclopentene, perfluorocyclohexene, chlorotrifluoro-ethylene (CTFE), dichlorodifluoroethylene, chloropentafluoropropene, perfluorobutadiene, perfluoro-methylvinylether, perfluoro-ethylvinylether, perfluoro-propylvinylether; CF$_3$OClC=CClF, trichloroethylene, tetrachloroethylene, dichloroethylene isomers; and fluorodioxoles.

In said step (IV), said compound comprising at least one group able of providing a nucleophilic substitution is advantageously selected from water or an alcohol having from 1 to 6 carbon atoms, more preferably ethanol, methanol or propanol.

Polymer (PFPE$_{OHOH}$) is advantageously prepared via a process [process (P$_{OHOH}$)] comprising:
(V) providing polymer (PFPE$_{EST}$) as defined in any one of the preceding Claims,
(VI) contacting said polymer (PFPE$_{EST}$) with a reducing agent so as to hydrolyse the ester groups at its chain ends into groups —CH$_2$OH, thus providing polymer (PFPE$_{OHOH}$).

Preferably, said step (VI) is performed in the presence of a base, such as sodium borohydride.

The Applicant further noted that said polymer (PFPE$_{OHOH}$) is useful as intermediate for the synthesis of further di-functional PFPE polymers.

On the one hand, said polymer (PFPE$_{OHOH}$) can be used as macromer in polycondensation reaction, such as to provide PFPE polymers comprising polyurethane group at their chain ends.

On the other hand, said polymer (PFPE$_{OHOH}$) can be reacted so as to modify the groups at its chain ends.

Notably, said polymer (PFPE$_{OHOH}$) is advantageously used for the synthesis of polymer [polymer (PFPE$_{OHOH-X}$)] comprising a perfluoropolyether backbone as defined above for polymer (PFPE$_{OHOH}$) having two chain ends, wherein at least one chain end comprises a group of formula —CF$_2$CH$_2$O—R$^1$,
wherein R$^1$ is selected from the group comprising linear or branched alkyl chain comprising from 1 to 16 carbon atoms and being substituted with at least 2, more preferably from 2 to 8, groups —OH; —(CH$_2$CH$_2$O)$_n$H with n being an integer from 1 to 10; —(CH$_2$CH$_2$O)$_n$P(O)(OH)$_2$ with n being 0 or an integer higher than 1; —CH$_2$CH=CH$_2$; —C(=O)—R$^2$ wherein R$^2$ is a linear or branched alkyl group comprising from 1 to 6 carbon atoms, alkenyl comprising from 2 to 12 carbon atoms or —NHR$^4$ with R$^4$ being hydrogen atom, a linear or branched alkyl chain comprising from 1 to 20 carbon atoms; phenyl group optionally substituted with at least one nitro group; and piridinyl group optionally substituted with at least one —CF$_3$ group.

Should the disclosure of any patents, patent applications, and publications which are incorporated herein by reference conflict with the description of the present application to the extent that it may render a term unclear, the present description shall take precedence.

The present invention will be now described in more detail with reference to the following examples, whose purpose is merely illustrative and not limitative of the scope of the invention.

EXPERIMENTAL SECTION

Materials

The reagents used in the following examples were obtained from Sigma-Aldrich and used as such.

The perfluoro-bis-vinyl ether were obtained from Ftoran GmbH & Co. KG/ANLES, Ltd.

Novec™ 7100 Engineered Fluid (methoxy-nonafluorobutane—HFE 7100) was obtained from 3M and used as such.

Perfluoropolyoxyalkylene diol Fomblin® Z PFPE polymers complying with the formulae provided below were obtained from Solvay Specialty Polymers Italy S.p.A.:

HOCH$_2$CF$_2$O(R$_f$)CF$_2$CH$_2$OH with (R$_f$) being —(CF$_2$CF$_2$O)$_{a1}$(CF$_2$O)$_{a2}$—
wherein a2/a1 ratio being about 1, and
for polymer PFPE$_1$: Mn=1,034 Dalton and F=1.99;
for polymer PFPE$_2$: Mn=3,045 Dalton and F=1.98.

Methods

NMR Analysis $^{19}$F-NMR and $^1$H-NMR spectra were recorded on an Agilent System 500 operating at 499.86 MHz for $^1$H and 470.30 MHz for $^{19}$F About 0.6 cc of each sample were introduced in a NMR tube and analysed neat.

The $^{19}$F-NMR spectrum was acquired so as to cover all the signals from about −10 to −170 ppm, with a pulse flip angle of 90° and a relaxation delay suitable for a quantitative analysis (3-5 times of maximum di value, at least 6 s). Number of scans was selected in order to have an adequate signal-to-noise ratio (at least 400).

The $^1$H-NMR spectrum was acquired with a spectral width of about 16 ppm, with a pulse flip angle of 45° and a relaxation delay suitable for a quantitative analysis (3-5 times of maximum di value, at least 5 s). Number of scans was selected in order to have an adequate signal-to-noise ratio (at least 100).

Both spectra were acquired at room temperature at spinning rate of 20 Hz.

$^{19}$F-NMR spectrum was used to determine the number average molecular weight (Mn) of the polymer. As known in the art, this was made possible by the fact that each structure resonate at different frequencies in the $^{19}$F-NMR spectrum and therefore they can be integrated separately. Therefore the integrated signals of the internal units (such as —(CF$_2$CF$_2$O)— and —(CF$_2$O)—) and the chain end groups, after normalization to the same number of fluorine atoms, were used to calculate the number average molecular weight Mn as follows:

$$M_n = 2 \times [(\Sigma_i U_i * M_i)/\Sigma_i T_i]$$

where
$U_i$ are the integrated signals of the internal units of the polymer,
$M_i$ the formula mass of each unit and
$T_i$ the integrated signals of the chain ends.

The relative amount of the different chain ends (measured as defined above) allowed also calculation of the functionality, which is defined as:

$$F = 2 \times (E_f/(E_f + E_n))$$

where
$E_f$ are the functional chain ends of interest and
$E_n$ are the chain ends different from $E_f$.

Example 1

Step 1

In a three-necked 250 ml flask, equipped with a magnetic stirrer, 0.66 g of tetramethylammonium hydroxide 25% w/w solution in water (0.047 mmoles) were introduced and added with 20 g (38.7 meq) of PFPE$_1$.

The mixture was heated under vacuum at 80° C. for 1 hour in order to completely remove water. After cooling at room temperature, 40 g of acetonitrile and 5.85 g (33.33 meq) of the perfluoro-bis-vinyl ether of formula:

CF$_2$=CFOCF$_2$CF$_2$CF$_2$OCF=CF$_2$ were added thereto.

Then, 2.7 g (19.5 moles) of anhydrous potassium carbonate were added under stirring in a single portion, and the reaction mixture was left under stirring at 50° C. for about seven hours. The reaction was considered terminated when $^{19}$F-NMR analysis showed the disappearance of the double bond signals of vinyl ether.

When the reaction was completed, the mixture was cooled to room temperature and washed with 50 g of water. Thereafter, 37 g of HFE 7100, and 4 g isobutyl alcohol were added into the reaction mixture to obtain the separation of two phases. The organic phase was separated and washed with 20 g of water and 3.6 g hydrochloric acid 37%. After decanting, two phases were obtained. The fluorinated phase (the bottom one) was evaporated under vacuum, to provide 23.1 g. of viscous clear liquid.

The structure of the product, determined by $^1$H-NMR and $^{19}$F-NMR was the following:

X—CF$_2$O—(R$_f$)—OCF$_2$CH$_2$
 [OCF$_2$CFHOC$_3$F$_6$OCFHCF$_2$OCH$_2$CF$_2$O—
 (R$_f$)—OCF$_2$CH$_2$]$_t$OH where
t=6.80
X=—CH$_2$OH (95%), —F (2%), —COOH (3%),
Mn=10,300 dalton
(F$_{OH}$)=1.90.

Step 2

18.8 g of the polymer obtained in Step 1 described above were charged in a 100 ml round bottom flask equipped with magnetic stirrer and added with 1.5 g of trifluoroaceticanhydride.

The mixture was kept for 1 hour at room temperature under stirring and then the formed trifluoroacetic acid and excess anhydride were distilled off at 80° C. under vacuum.

18.3 g of the product having the following structure were obtained:

X—CF$_2$O—(R$_f$)—OCF$_2$CH$_2$
 [OCF$_2$CFHOC$_3$F$_6$OCFHCF$_2$OCH$_2$CF$_2$O—
 (R$_f$)—OCF$_2$CH$_2$]$_t$OC(=O)CF$_3$ where
t=6.80
X=—CH$_2$OC(=O)CF$_3$, —F and —COOH;
(F$_{—OCOCF3}$)=1.90.

Step 3

18.3 g of the polymer obtained in Step 2 described above were dissolved in 92.5 g of perfluoro-2-butyltetrahydrofuran (C$_8$F$_{16}$O). The mixture was loaded in a 250 ml stainless steel reactor equipped with mechanical stirrer, a thermocouple and two inlet pipes and kept at 0° C. by an external circulating bath.

While keeping a high speed stirring, 6.0 Nl/h of helium were fed to the reactor by the first inlet pipe for 1 hour, then 2.0 Nl/h of elemental fluorine were added to the same stream; after 2 hours, 0.3 Nl/h of carbon monoxide diluted in 1.5 Nl/h of helium have been fed to the reactor by the second inlet pipe; after further 4 hours elemental fluorine and carbon monoxide flows were closed and the reactor was purged by the residual helium flows.

The crude mixture was analyzed by $^1$H-NMR confirming a quantitative conversion of all hydrogen atoms. The mixture was then treated with excess ethanol at reflux, to convert all the terminal perfluoester groups to the corresponding ethylester groups. The mixture was washed twice with water, then treated with sodium sulfate and finally evaporated to remove the perfluorinated solvent and recover the product complying with the following formula:

XCF$_2$O—(R$_f$)—OCF$_2$
 [CF$_2$OCF$_2$CF$_2$OC$_3$F$_6$OCF$_2$CF$_2$OCF$_2$CF$_2$O—
 (R$_f$)—OCF$_2$]$_t$—C(=O)X1    [II]

where
t=6.38
X=—COOEt (90.5%), —F (7.8%), —CF$_3$ (1.6%)
X1=—OEt
(F$_{—COOET}$)=1.81
Mn=10,600.

Step 4

The polymer obtained in Step 3 described above was reduced from the ethyl ester terminal group to the corresponding alcohol, following the procedure reported in: A. Russo, C. Tonelli; Journal of Fluorine Chemistry 125 (2004) 181-188, to obtain the final polymer complying with the following formula:

X—CF$_2$O—(R$_f$)—OCF$_2$
 [CF$_2$OCF$_2$CF$_2$OC$_3$F$_6$OCF$_2$CF$_2$OCF$_2$CF$_2$O—
 (R$_f$)—OCF$_2$]$_t$CH$_2$OH    [IV]

where
t=6.38
X=—CH$_2$OH, —F, —CF$_3$
(F$_{OHOH}$)=1.81
Mn=10,500 Dalton.

Example 2

Step 1

In a three-necked 250 ml flask, equipped with a magnetic stirrer, 0.3 g of tetramethylammonium hydroxide 25% w/w solution in water (0.823 mmoles) were introduced and added with 25 g (16.3 meq) of PFPE$_2$.

The mixture was heated under vacuum at 80° C. for 1 hour. After cooling at room temperature, 35 g of acetonitrile and 2.45 g (14 meq) of the perfluoro-bis-vinyl ether of formula:

CF$_2$=CFOCF$_2$CF$_2$CF$_2$OCF=CF$_2$ were added thereto.

Then, 1.18 g (8.55 moles) of anhydrous potassium carbonate were added under stirring in a single portion, and the reaction mixture was left under stirring at 50° C. for about seven hours. The reaction was considered terminated when $^{19}$F-NMR analysis showed the disappearance of the double bond signals of vinyl ether.

When the reaction was completed, the mixture was cooled to room temperature and washed with 50 g of water. Thereafter, 37 g of HFE 7100, and 4 g isobutyl alcohol were added into the reaction mixture to obtain the separation of two phases. The organic phase was separated and washed with 20 g of water and 3.6 g hydrochloric acid 37%. After decanting, two phases were obtained. The fluorinated phase (the bottom one) was evaporated under vacuum, to provide 23 g of viscous clear liquid.

The structure of the product, determined by $^1$H-NMR and $^{19}$F-NMR was the following:

X—CF$_2$O—(R$_f$)—OCF$_2$CH$_2$
[OCF$_2$CFHOC$_3$F$_6$OCFHCF$_2$OCH$_2$CF$_2$O—
(R$_f$)—OCF$_2$CH$_2$]$_t$OH where
t=6.04
X=—CH$_2$OH, —F, —CF$_3$, —COOH,
Mn=23,560 dalton,
(F$_{OH}$)=1.95.

Example 3

Step 1

The same procedure disclosed in Example 1—Step 1 was followed, but using the following reactants:
20 g (38.7 meq) of PFPE$_2$
0.66 g of tetramethylammonium hydroxide 25% w/w solution in water (1.8 mmoles).

22.6 g of viscous clear liquid were obtained.

The structure of the product, determined by $^1$H-NMR and $^{19}$F-NMR was the following:

X—CF$_2$O—(R$_f$)—OCF$_2$CH$_2$
[OCF$_2$CFHOC$_3$F$_6$OCFHCF$_2$OCH$_2$CF$_2$O—
(R$_f$)—OCF$_2$CH$_2$]$_t$OH where
t=17.12,
X=—CH$_2$OH, —F, —CF$_3$, —COOH,
Mn=24,940 dalton,
(F$_{OH}$)=1.90.

The invention claimed is:

1. A perfluoropolyether polymer [polymer (PFPE$_{EST}$)] comprising a fully fluorinated backbone having two chain ends [chains (E$_{PFPE-EST}$)] bonded to opposite sides of said backbone,
    at least one of said chain (E$_{PFPE-EST}$) comprising one group of formula —C(=O)X$^1$ with X$^1$ being —OH or an alkoxy chain comprising from 1 to 6 carbon atoms, and the other chain (E$_{PFPE-EST}$) comprising a group of formula —F, —CF$_3$ or —C(=O)X$^1$ with X$^1$ being as defined above,
    and wherein said backbone complies with the following formula:

—(CFX$^\#$)$_{z1}$O(R$_f$)(CFX*)$_{z2}$D$_F$*-[O—CF$_2$CF$_2$
(CF$_2$)$_z$O—R$_{CF}$—O(CF$_2$)$_{z*}$CF$_2$CF$_2$—R$_{pf-F}$]$_t$— wherein:
t is in integer from 1 to 30,
each of z and z* is independently 0 or 1;
z1 is an integer equal to or higher than 1;
z2 is 0 or an integer equal to or higher than 1;
X$^\#$ and X*, equal or different from each other, are —F or —CF$_3$, provided that when z1 and/or z2 are higher than 1, X$^\#$ and X* are —F;
D$_F$* is a perfluorinated alkylene chain comprising from 1 to 6 carbon atoms, said alkyl chain being optionally substituted with at least one perfluoroalkyl group comprising from 1 to 3 carbon atom;
R$_{CF}$ is a perfluoro alkyl chain comprising from 2 to 12 carbon atoms, optionally interrupted by one or more oxygen atoms;
(R$_f$) comprises repeating units R°, said repeating units being independently selected from the group consisting of:
(i) —CFXO—, wherein X is F or CF$_3$;
(ii) —CFXCFXO—, wherein X, equal or different at each occurrence, is F or CF$_3$, with the proviso that at least one of X is —F;
(iii) —CF$_2$CF$_2$CF$_2$O—;
(iv) —CF$_2$CF$_2$CF$_2$CF$_2$O—;
(v) —(CF$_2$)$_j$—CFZ—O— wherein j is an integer from 0 to 3 and Z is a group of general formula —O—R$_{(f-a)}$-T, wherein R$_{(f-a)}$ is a fluoropolyoxyalkene chain comprising a number of repeating units from 0 to 10, said recurring units being selected from the group consisting of: —CFXO—, —CF$_2$CFXO—, —CF$_2$CF$_2$CF$_2$O—, —CF$_2$CF$_2$CF$_2$CF$_2$O—, with each of each of X being independently F or CF$_3$ and T being a C$_1$-C$_3$ perfluoroalkyl group;
R$_{pf-F}$ is a chain of formula:

—O-D$_F$-(CFX$^\#$)$_{z1}$—O(R$_f$)(CFX*)$_{z2}$— wherein
z1, z2, X$^\#$, X* and (R$_f$) are as defined above;
D$_F$ is a perfluorinated alkylene chain comprising from 1 to 6 carbon atoms, said alkyl chain being optionally substituted with at least one perfluoroalkyl group comprising from 1 to 3 carbon atoms.

2. Polymer (PFPE$_{EST}$) according to claim 1, said polymer having a number average molecular weight (Mn) of from 7,000 Dalton (as measured by $^{19}$F-NMR), and up to 30,000 Dalton.

3. Polymer (PFPE$_{EST}$) according to claim 1, said polymer having a functionality (F$_{EST}$) of at least 1.80.

4. A partially fluorinated polyether polymer [polymer (HFPE)] comprising a partially fluorinated polyether backbone having two chain ends [chains (E$_{HFPE}$)] bonded to opposite sides of said backbone, at least one of said chains ($E_{HFPE}$) comprising one —OH group and the other chain ($E_{HFPE}$) comprising a group selected from —OH, —F, —CF$_3$ and —COOH, wherein said backbone complies with the following formula:

-D(CFX$^\#$)$_{z1}$O(R$_f$)(CFX*)$_{z2}$D*-[OCF$_2$CFH(CF$_2$)$_z$O—R$_{CF}$—O(CF$_2$)$_{z*}$CFHCF$_2$—R$_{pf}$]$_t$— wherein
t is an integer from 1 to 30;
each of z and z* is independently 0 or 1;
$R_{CF}$ is a perfluoro alkyl chain comprising from 1 to 12 carbon atoms, optionally interrupted by one or more oxygen atoms;
z1 and z2, equal or different from each other, are integers, equal to or higher than 1;
X$^\#$ and X*, equal or different from each other, are —F or —CF$_3$, provided that when z1 and/or z2 are higher than 1, X$^\#$ and X* are —F;
D and D*, equal or different from each other, are a sigma bond, or an alkylene chain comprising from 1 to carbon atoms, said alkyl chain being optionally substituted with at least one perfluoroalkyl group comprising from 1 to 3 carbon atoms;
$R_{pf}$ is a chain of formula:

—O-D-(CFX$^\#$)$_{z1}$—O(R$_f$)(CFX*)$_{z2}$-D*- wherein z1, z2, X$^\#$, X*, D and D* are as defined above, and
(R$_f$) comprises repeating units R°, selected from the group consisting of formulae (i) to (v) as defined above.

5. Polymer (HFPE) according to claim 4, said polymer having a number average molecular weight (Mn) of from 7,000 Dalton (as measured by $^{19}$F-NMR) and up to 30,000 Daltons; and/or a functionality ($F_{HFPE-OH}$) of at least 1.80.

6. A partially fluorinated polyether polymer [polymer (HFPE$_P$)] comprising a partially fluorinated backbone having two chain ends [chains ($E_{HFPE-P}$)] bonded to opposite sides of said backbone, at least one of said chains ($E_{HFPE-P}$) comprising a group —OC(=O)R$^3$ with R$^3$ with R$^3$ being —F, —CF$_3$ or a linear or branched perfluorinated alkyl chain comprising from 2 to 6 carbon atoms, optionally interrupted by oxygen atoms and the other chain end comprising a group —OC(=O)R$_3$ with R$_3$ being as defined above or a group of formula —F, —CF$_3$ or —COOH; said backbone complying with the following formula:

-D(CFX$^\#$)$_{z1}$O(R$_f$)(CFX*)$_{z2}$D*-[OCF$_2$CFH(CF$_2$)$_z$O—R$_{CF}$—O(CF$_2$)$_{z*}$CFHCF$_2$—R$_{pf}$]$_t$— wherein
t is an integer from 1 to 30;
each of z and z* is independently 0 or 1;
$R_{CF}$ is a perfluoro alkyl chain comprising from 1 to 12 carbon atoms, optionally interrupted by one or more oxygen atoms;
X$^\#$ and X*, equal or different from each other, are —F or —CF$_3$;
D and D*, equal or different from each other, are a sigma bond, or an alkylene chain comprising from 1 to carbon atoms, said alkyl chain being optionally substituted with at least one perfluoroalkyl group comprising from 1 to 3 carbon atoms;
$R_{pf}$ is a chain of formula:

—O-D-(CFX$^\#$)$_{z1}$—O(R$_f$)(CFX*)$_{z2}$-D*- z1 and z2, equal or different from each other, are integers, equal to or higher than 1 wherein X$^\#$, X*, D and D* are as defined above.

7. Polymer (HFPE$_P$) according to claim 6, said polymer having a number average molecular weight (Mn) of from 7,000 Dalton (as measured by $^{19}$F-NMR) and up to 30,000 Daltons; and/or a functionality ($F_{HFPE-P}$) of at least 1.80.

8. A fully fluorinated polyether polymer [polymer (PFPE$_P$)] comprising a fully fluorinated polyether backbone having two chain ends [chains ($E_{PFPE-P}$)] bonded to opposite sides of said backbone, at least one of said chains ($E_{PFPE-P}$) comprising a group —OC(=O)R$^3$ with R$^3$ being —F, —CF$_3$ or a linear or branched perfluorinated alkyl chain comprising from 2 to 6 carbon atoms, optionally interrupted by oxygen atoms, and the other chain ($E_{PFPE-P}$) comprising a group of formula —F, —CF$_3$ or a group —OC(=O)R$^3$ with R$^3$ being as defined above;

said backbone complying with the following formula:

—(CFX$^\#$)$_{z1}$O(R$_f$)(CFX*)$_{z2}$D$_F$*-[O—CF$_2$CF$_2$(CF$_2$)$_z$O—R$_{CF}$—O(CF$_2$)$_{z*}$CF$_2$CF$_2$—R$_{pf-F}$]$_t$— wherein
t is in integer from 1 to 30,
each of z and z* is independently 0 or 1;
z1 is an integer equal to or higher than 1;
z2 is 0 or an integer, equal to or higher than 1;
X$^\#$ and X*, equal or different from each other, are —F or —CF$_3$, provided that when z1 and/or z2 are higher than 1, X$^\#$ and X* are —F;
D$_F$* is a perfluorinated alkylene chain comprising from 1 to 6 carbon atoms, said alkyl chain being optionally substituted with at least one perfluoroalkyl group comprising from 1 to 3 carbon atom;
$R_{CF}$ is a perfluoro alkyl chain comprising from 2 to 12 carbon atoms, optionally interrupted by one or more oxygen atoms;
(R$_f$) comprises repeating units R°, said repeating units being independently selected from the group consisting of:
(i) —CFXO—, wherein X is F or CF$_3$;
(ii) —CFXCFXO—, wherein X, equal or different at each occurrence, is F or CF$_3$, with the proviso that at least one of X is —F;
(iii) —CF$_2$CF$_2$CW$_2$O—, wherein each of W, equal or different from each other, are F;
(iv) —CF$_2$CF$_2$CF$_2$CF$_2$O—;
(v) —(CF$_2$)$_j$—CFZ—O— wherein j is an integer from 0 to 3 and Z is a group of general formula —O—R$_{f-a}$-T, wherein R$_{(f-a)}$ is a fluoropolyoxyalkene chain comprising a number of repeating units from 0 to 10, said recurring units being from the group consisting of: —CFXO—, —CF$_2$CFXO—, —CF$_2$CF$_2$CF$_2$O—, and —CF$_2$CF$_2$CF$_2$CF$_2$O—, with each of each of X being independently F or CF$_3$ and T being a C$_1$-C$_3$ perfluoroalkyl group;
$R_{pf-F}$ is a chain of formula:

—O-D$_F$-(CFX$^\#$)$_{z1}$—O(R$_f$)(CFX*)$_{z2}$-D$_F$*- wherein
z1, z2, X$^\#$, X* and (R$_f$) are as defined above;
D$_F$ and D$_F$*, equal or different from each other, are a perfluorinated alkylene chain comprising from 1 to 6 carbon atoms, said alkyl chain being optionally substituted with at least one perfluoroalkyl group comprising from 1 to 3 carbon atoms.

9. Polymer (PFPE$_P$) according to claim 8, said polymer having a number average molecular weight (Mn) of from 7,000 Dalton (as measured by $^{19}$F-NMR) and up to 30,000 Daltons; and/or a functionality ($F_{HFPE-P}$) of at least 1.80.

10. A process [process (P)] for the manufacture of polymer (PFPE$_{EST}$) as defined claim 1, said process comprising the following steps:

(I) reacting at least one perfluoropolyether diol [polymer (PFPE)] having a functionality of at least 1.90 with at least one perfluoro-bis-vinylether [compound (F)] to provide at least one partially fluorinated polyether polymer [polymer (HFPE)] comprising a partially fluorinated polyether backbone having two chain ends [chains (E$_{HFPE}$)] bonded to opposite sides of said backbone, at least one of said chains (E$_{HFPE}$) comprising one —OH group and the other chain (E$_{HFPE}$) comprising a group selected from —OH, —F, —CF$_3$ or —COOH, wherein the equivalent ratio between said polymer (PFPE) and said compound (F) is higher than 1;

(II) contacting said at least one polymer (HFPE) obtained in step (I) with at least one compound selected from the group consisting of perfluorinated anhydride, perfluorinated carboxylic acid, carbonyl difluoride, perfluoro acyl fluoride and perfluoro acyl chloride, to provide at least one partially fluorinated polyether polymer [polymer (HFPE$_P$)] comprising a partially fluorinated polyether backbone having two chain ends [chains (E$_{HFPE-P}$)] bonded to opposite sides of said backbone, at least one of said chains (E$_{HFPE-P}$) comprising an ester group or a fluoroformate, and the other chain (E$_{HFPE-P}$) comprising an ester group, a fluoroformate or a group of formula —F, —CF$_3$ or —COOH;

(III) contacting said at least one polymer (HFPE$_P$) obtained in step (II) with at least one source of fluorine, to provide at least one fully fluorinated polyether polymer [polymer (PFPE$_P$)] comprising a fully fluorinated polyether backbone having two chain ends [chains (E$_{PFPE-P}$)] bonded to opposite sides of said backbone, at least one of said chains (E$_{PFPE-P}$) comprising a group —OC(=O)R$^3$ with R$^3$ being —F, —CF$_3$ or a linear or branched perfluorinated alkyl chain comprising from 2 to 6 carbon atoms, optionally interrupted by oxygen atoms, and the other chain (E$_{PFPE-P}$) comprising a group of formula —F, —CF$_3$ or a group —OC(=O)R$^3$ with R$^3$ being as defined above;

(IV) contacting said at least one polymer (PFPE$_P$) with a compound comprising at least one group able of providing a nucleophilic substitution, to provide a perfluoropolyether polymer [polymer (PFPE$_{EST}$)].

11. Process (P) according to claim 10, wherein said compound (F) complies with the following formula:

wherein each of z and z* is independently 0 or 1; and

R$_{CF}$ is a perfluoro alkyl chain comprising from 2 to 12 carbon atoms, optionally interrupted by one or more oxygen atoms.

12. Process (P) according to claim 10, wherein the equivalent ratio between said polymer (PFPE) and said compound (F) is from 1.01 to 1.50.

13. Process (P) according to claim 10, wherein said step (I) is performed:

in the presence of a base; and/or
in the presence of a polar aprotic solvent; and/or
at a temperature in the range from 25° C. to 90° C.; and/or
in the presence of a phase transfer catalyst; and/or
in an anhydrous reaction environment.

14. Process (P) according to claim 10, wherein said step (I) is performed such that the functionality of polymer (HFPE) is not less than 90% of the functionality of said polymer (PFPE).

15. A perfluoropolyether polymer [polymer (PFPE$_{OHOH}$)] comprising a fully fluorinated polyether backbone having two chain ends [chains (E$_{PFPE-OHOH}$)] bonded to opposite sides of said backbone, at least one of said chains (E$_{PFPE-OHOH}$) comprising one group of formula —CH$_2$OH, and the other chain end comprising a group of formula —CH$_2$OH, —F, —CF$_3$;

said backbone complying with the following formula:

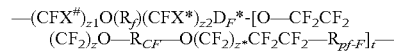

wherein t is in integer from 1 to 30, each of z and z* is independently 0 or 1;

z1 is an integer equal to or higher than 1;

z2 is 0 or an integer, equal to or higher than 1;

X$^{\#}$ and X*, equal or different from each other, are —F or —CF$_3$, provided that when z1 and/or z2 are higher than 1, X$^{\#}$ and X* are —F;

D$_F$* is a perfluorinated alkylene chain comprising from 1 to 6 carbon atoms, said alkyl chain being optionally substituted with at least one perfluoroalkyl group comprising from 1 to 3 carbon atom;

R$_{CF}$ is a perfluoro alkyl chain comprising from 2 to 12 carbon atoms, optionally interrupted by one or more oxygen atoms;

(R$_f$) comprises repeating units R°, said repeating units being independently selected from the group consisting of:

(i) —CFXO—, wherein X is F or CF$_3$;

(ii) —CFXCFXO—, wherein X, equal or different at each occurrence, is F or CF$_3$, with the proviso that at least one of X is —F;

(iii) —CF$_2$CF$_2$CW$_2$O—, wherein each of W, equal or different from each other, are F;

(iv) —CF$_2$CF$_2$CF$_2$CF$_2$O—;

(v) —(CF$_2$)$_j$—CFZ—O— wherein j is an integer from 0 to 3 and Z is a group of general formula —O—R$_{(f-a)}$-T, wherein R$_{(f-a)}$ is a fluoropolyoxyalkene chain comprising a number of repeating units from 0 to 10, said recurring units being chosen among the following: —CFXO—, —CF$_2$CFXO—, —CF$_2$CF$_2$CF$_2$O—, —CF$_2$CF$_2$CF$_2$CF$_2$O—, with each of each of X being independently F or CF$_3$ and T being a C$_1$-C$_3$ perfluoroalkyl group;

R$_{pf-F}$ is a chain of formula:

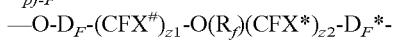

wherein z1, z2, X$^{\#}$, X* and (R$_f$) are as defined above;

D$_F$ and D$_F$*, equal or different from each other, are a perfluorinated alkylene chain comprising from 1 to 6 carbon atoms, said alkyl chain being optionally substituted with at least one perfluoroalkyl group comprising from 1 to 3 carbon atoms.

16. Polymer (PFPE$_{OHOH}$) according to claim 15, said polymer having a number average molecular weight (Mn) of from 7,000 Daltons (as measured by $^{19}$F-NMR) and up to 30,000 Daltons; and/or functionality of (F$_{HFPE-P}$) of at least 1.80.

17. A process [process ($P_{OHOH}$)] for the synthesis of polymer ($PFPE_{OHOH}$) as defined in claim 15, said process ($P_{OHOH}$) comprising:

(V) providing polymer ($PFPE_{EST}$), (VI) contacting said polymer ($PFPE_{EST}$) with at least one reducing agent so as to hydrolyse the ester groups at the chain ends of said polymer ($PFPE_{EST}$) into groups —$CH_2OH$, thus providing polymer ($PFPE_{OHOH}$), wherein the perfluoropolyether polymer [polymer ($PFPE_{EST}$)] comprises a fully fluorinated backbone having two chain ends [chains ($E_{PFPE-EST}$)] bonded to opposite sides of said backbone, at least one of said chain ($E_{PFPE-EST}$) comprising one group of formula —C(=O)$X^1$ with $X^1$ being —OH or an alkoxy chain comprising from 1 to 6 carbon atoms, and the other chain ($E_{PFPE-EST}$) comprising a group of formula —F, —$CF_3$ or —C(=O)$X^1$ with $X^1$ being as defined above, and wherein said backbone complies with the following formula:

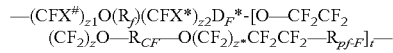
—(CFX$^\#$)$_{z1}$O(R$_f$)(CFX*)$_{z2}$D$_F$*-[O—CF$_2$CF$_2$(CF$_2$)$_z$O—R$_{CF}$—O(CF$_2$)$_{z*}$CF$_2$CF$_2$—R$_{pfF}$]$_t$— wherein:

t is in integer from 1 to 30, each of z and z* is independently 0 or 1;

z1 is an integer equal to or higher than 1;

z2 is 0 or an integer equal to or higher than 1;

$X^\#$ and X*, equal or different from each other, are —F or —$CF_3$, provided that when z1 and/or z2 are higher than 1, $X^\#$ and X* are —F;

$D_F$* is a perfluorinated alkylene chain comprising from 1 to 6 carbon atoms, said alkyl chain being optionally substituted with at least one perfluoroalkyl group comprising from 1 to 3 carbon atom;

$R_{CF}$ is a perfluoro alkyl chain comprising from 2 to 12 carbon atoms, optionally interrupted by one or more oxygen atoms;

(R$_f$) comprises repeating units R°, said repeating units being independently selected from the group consisting of:

(i) —CFXO—, wherein X is F or $CF_3$;

(ii) —CFXCFXO—, wherein X, equal or different at each occurrence, is F or $CF_3$, with the proviso that at least one of X is —F;

(iii) —$CF_2CF_2CF_2O$—;

(iv) —$CF_2CF_2CF_2CF_2O$—;

(v) —(CF$_2$)$_j$—CFZ—O— wherein j is an integer from 0 to 3 and Z is a group of general formula —O—R$_{(f-a)}$-T, wherein R$_{(f-a)}$ is a fluoropolyoxyalkene chain comprising a number of repeating units from 0 to 10, said recurring units being selected from the group consisting of: —CFXO—, —$CF_2$CFXO—, —$CF_2CF_2CF_2O$—, —$CF_2CF_2CF_2CF_2O$—, with each of each of X being independently F or $CF_3$ and T being a $C_1$-$C_3$ perfluoroalkyl group;

$R_{pf-F}$ is a chain of formula:

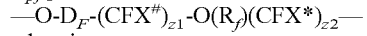
—O-D$_F$-(CFX$^\#$)$_{z1}$-O(R$_f$)(CFX*)$_{z2}$— wherein z1, z2, $X^\#$, X* and (R$_f$) are as defined above;

$D_F$ is a perfluorinated alkylene chain comprising from 1 to 6 carbon atoms, said alkyl chain being optionally substituted with at least one perfluoroalkyl group comprising from 1 to 3 carbon atoms.

* * * * *